(12) United States Patent
Mantell et al.

(10) Patent No.: US 11,731,366 B2
(45) Date of Patent: Aug. 22, 2023

(54) METHOD AND SYSTEM FOR OPERATING A METAL DROP EJECTING THREE-DIMENSIONAL (3D) OBJECT PRINTER TO FORM ELECTRICAL CIRCUITS ON SUBSTRATES

(71) Applicant: Xerox Corporation, Norwalk, CT (US)

(72) Inventors: David A. Mantell, Rochester, NY (US); Christopher T. Chungbin, Webster, NY (US); Daniel R. Cormier, Pittsford, NY (US); Denis Cormier, Pittsford, NY (US); Manoj Meda, Brighton, NY (US); Dinesh Krishna Kumar Jayabal, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 252 days.

(21) Appl. No.: 16/945,509

(22) Filed: Jul. 31, 2020

(65) Prior Publication Data
US 2022/0032550 A1    Feb. 3, 2022

(51) Int. Cl.
*B29C 64/393*    (2017.01)
*B33Y 50/02*    (2015.01)
(Continued)

(52) U.S. Cl.
CPC ............ *B29C 64/393* (2017.08); *B22F 10/22* (2021.01); *B22F 10/85* (2021.01); *B22F 12/53* (2021.01);
(Continued)

(58) Field of Classification Search
USPC ......................................................... 700/118
See application file for complete search history.

(56) References Cited

U.S. PATENT DOCUMENTS 4,832,911 A * 5/1989 Dube ...................... C22C 1/026
420/528
6,129,872 A   10/2000 Jang
(Continued)

FOREIGN PATENT DOCUMENTS

CN    105618756 A * 6/2016
CN    106475564 A * 3/2017
(Continued)

OTHER PUBLICATIONS

3ders.org; New 3-way extruder and color blending nozzle developed for multi-colour/material 3D printing; 3D Printing Technology; Aug. 25, 2012; 11 Pages; www.3ders.org.
(Continued)

*Primary Examiner* — Mohammad Ali
*Assistant Examiner* — Joshua T Sanders
(74) *Attorney, Agent, or Firm* — Maginot Moore & Beck LLP

(57) ABSTRACT

A three-dimensional (3D) metal object manufacturing apparatus selects operational parameters for operation of the printer to form conductive metal traces on substrates with dimensions within appropriate tolerances and with sufficient conductive material to carry electrical currents without burning up or becoming too hot. The apparatus identifies the material of the substrate and the bulk metal being melted for ejection and uses this identification data to select the operational parameters. Thus, the apparatus can form conductive traces and circuits on a wide range of substrate materials including polymeric substrates, semiconductor materials, oxide layers on semiconductor materials, glass, and other crystalline materials.

10 Claims, 5 Drawing Sheets

(51) Int. Cl.
*B33Y 70/00* (2020.01)
*B33Y 80/00* (2015.01)
*B29C 64/112* (2017.01)
*B29C 64/209* (2017.01)
*B22F 12/53* (2021.01)
*B22F 10/85* (2021.01)
*B22F 10/22* (2021.01)

(52) U.S. Cl.
CPC .......... *B29C 64/112* (2017.08); *B29C 64/209* (2017.08); *B33Y 50/02* (2014.12); *B33Y 70/00* (2014.12); *B33Y 80/00* (2014.12)

(56) References Cited

U.S. PATENT DOCUMENTS

| | | | |
|---|---|---|---|
| 6,238,613 | B1 | 5/2001 | Batchedlder et al. |
| 6,593,053 | B1 | 7/2003 | Chang et al. |
| 6,773,249 | B1 | 8/2004 | Przytulla et al. |
| 7,604,470 | B2 | 10/2009 | LaBossiere et al. |
| 7,765,949 | B2 | 8/2010 | Fork et al. |
| 8,801,415 | B2 | 8/2014 | Khoshnevis |
| 8,827,684 | B1 | 9/2014 | Schumacher et al. |
| 9,757,900 | B2 | 9/2017 | Nystrom et al. |
| 9,993,964 | B2 | 6/2018 | Mantell |
| 2004/0141018 | A1 | 7/2004 | Silverbrook |
| 2004/0164436 | A1 | 8/2004 | Khoshnevis |
| 2004/0253365 | A1 | 12/2004 | Warren et al. |
| 2014/0039659 | A1 | 2/2014 | Boyer et al. |
| 2014/0048969 | A1 | 2/2014 | Swanson et al. |
| 2014/0121813 | A1 | 5/2014 | Schmehl |
| 2014/0242208 | A1 | 8/2014 | Esworthy |
| 2014/0291886 | A1 | 10/2014 | Mark et al. |
| 2014/0328964 | A1 | 11/2014 | Mark et al. |
| 2014/0363532 | A1 | 12/2014 | Wolfgram |
| 2014/0368568 | A1 | 12/2014 | Kodama et al. |
| 2015/0035198 | A1 | 2/2015 | Saba |
| 2015/0056432 | A1 | 2/2015 | Solberg |
| 2015/0077215 | A1 | 3/2015 | Ranky et al. |
| 2015/0093468 | A1 | 4/2015 | Page |
| 2016/0136897 | A1 | 5/2016 | Nielsen-Cole et al. |
| 2016/0318130 | A1* | 11/2016 | Stempfer ........... B23K 15/0086 |
| 2016/0325498 | A1 | 11/2016 | Gelbert |
| 2016/0346997 | A1 | 12/2016 | Lewis et al. |
| 2017/0087632 | A1 | 3/2017 | Mark |
| 2017/0157828 | A1 | 6/2017 | Mandel et al. |
| 2017/0157831 | A1 | 6/2017 | Mandel et al. |
| 2017/0157843 | A1 | 6/2017 | Nystrom et al. |
| 2017/0157844 | A1 | 6/2017 | Mandel et al. |
| 2017/0217089 | A1* | 8/2017 | Batchelder ............ B33Y 50/02 |
| 2017/0252827 | A1 | 9/2017 | Sachs et al. |
| 2017/0334137 | A1 | 11/2017 | Nystrom et al. |
| 2018/0111306 | A1 | 4/2018 | Mandel et al. |
| 2018/0111308 | A1 | 4/2018 | Mantell et al. |
| 2018/0111336 | A1 | 4/2018 | Mantell. et al. |
| 2021/0380832 | A1* | 12/2021 | Mavuri ................ C09D 11/322 |

FOREIGN PATENT DOCUMENTS

| | | |
|---|---|---|
| EP | 3117892 A1 | 1/2017 |
| WO | 2014/200595 A2 | 12/2014 |
| WO | 2015027938 A1 | 3/2015 |
| WO | 2015077262 A1 | 5/2015 |
| WO | 2019/068070 A1 | 4/2019 |

OTHER PUBLICATIONS

Sure Tack Systems; Automatic Adhesive Applicator Equipment; Brochure; 2018; 3 Pages; https://suretacksystems.com/products/automatic-applicators/.

Francis X. Govers III; Diamond Hotend makes multi-color 3D printing possible from a single nozzle; Gizmag; Apr. 12, 2015; 6 Pages; www.gizmag.com.

Sure Tack Systems; HA2 Series Extrusion Hot Melt Applicator; Brochure; 2018; 4 Pages; https://suretacksystems.com/extrusion.

Nscrypt, Inc.; World-wide Leader in Micro to Pico-liter Dispensing Systems with our Patented Micro Dispense Pump; nScrypt, Inc.; 2001-2012; 3 Pages; www.nscrypt.com.

e3d-online.com; Multi-Extrusion; E3D-ONLINE; 2014; 6 Pages; www.e3d-online.com/Multi-Extrusion.

Simplify 3D; Printing with Multiple Extruders; Jul. 23, 2015; 5 Pages; www.simplify3d.com/support/tutorials.

Isaac Budmen; Understanding Shells, Layer Height and Infill; Team Budmen; Sep. 2013; 1 Page; www.blog.teambudmen.com.

European Patent Office, Extended European Search Report corresponding to European Patent Application No. 21 18 2997 (9 pages), dated Dec. 15, 2021, Munich, Germany.

Trlica, C. et al., "3-D printing of liquid metals for stretchable and flexible conductors," Proceedings of SPIE, IEEE, US, vol. 9083, Jun. 4, 2014 (10 pages).

* cited by examiner

METHOD AND SYSTEM FOR OPERATING A METAL DROP EJECTING THREE-DIMENSIONAL (3D) OBJECT PRINTER TO FORM ELECTRICAL CIRCUITS ON SUBSTRATES

TECHNICAL FIELD

This disclosure is directed to melted metal ejectors used in three-dimensional (3D) object printers and, more particularly, to operation of the ejectors to form electrical circuits on substrates.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material that form a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that are fed into a heating chamber where they are melted and the melted metal flows into a chamber of the ejector. The chamber is made of non-conductive material around which an uninsulated electrical wire is wrapped. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed.

Some electronic devices are currently manufactured using direct write (DW) methods. These DW methods include inkjet printing, aerosol jet printing, and micro-dispensing. In these methods, solvent-based inks containing electrically conductive nanoparticles are deposited onto substrates to form metal traces or lines of conductive material on a substrate and these traces are connected to one another and to some leads of electronic components positioned on the substrate to form an electronic device. Examples of substrates include silicon wafers, their oxides, or other electrical components integrated into or deposited on the wafer. Substrates can also be made from polymer, ceramic, or glass.

One of the issues associated with these DW methods is the cost of the conductive inks. Production of the nanoparticle sized metal suspended in the solvents is much higher than forms of bulk metal, such as rolls of aluminum or copper wire. As used in this document, the term "bulk metal" refers to conductive metal available in aggregate form, such as wire of a commonly available gauge or pellets of macro-sized proportions. Another issue is the higher electrical resistivity of the conductive inks over the electrical resistivity of bulk metals. Also, the DW methods require additional processing after the dispensing process. For example, conductive inks require sintering to remove the solvents and fuse the metal nanoparticles together.

Using a melted metal drop ejector to form electrical traces on a substrate with the melted metal drops seems feasible. Yet efforts to do so have proved to be unreliable and, in some cases, destructive of the substrate. Some of the issues that arise include difficulties in getting the metal drops to adhere to the substrate and the generation of stresses in the traces that can disrupt the integrity of the substrate because the material properties of the melted metal drops and the substrate are so different. These stresses are produced by two effects. One effect arises from the trace being be very hot when printed onto the substrate. As the trace cools and shrinks, it produces stress in the substrate during the printing process. The second effect occurs when the substrate is cooled off so the metal drops and the substrate contract at different rates.

Sometimes the substrate is damaged locally by melting or delamination induced by the heat transferred from the melted metal drops to the substrates. In other cases, the generation of tensile stresses in the substrate occurs because the metal drops and most substrates have different thermal coefficients of expansion. Some of these stresses are sufficient to warp and, in some cases, even break the substrate. Even if the substrate does not crack, the warped material can preclude the component from operating correctly and the component has to be scrapped. Additionally, being able to form electrical traces with a sufficient amount of bulk metal so they conduct an adequate amount of electrical current without burning up is problematic as that amount of melted metal drops on the substrate may impart a thermal load heavy enough to damage the substrate. These amounts may also cause the metal drops to spread wider than wanted or to coalesce unevenly so the tolerances for the trace dimensions are hard to maintain. Using smaller drops in an effort to avoid some of these problems leads to losses in productivity of the components. Being able to form conductive metal traces on substrates with melted metal drops from known metal drop ejectors would be beneficial.

SUMMARY

A new method of operating a metal ejecting 3D object printer adjusts operation of the ejector(s) in the printer to form conductive metal traces on substrates with dimensions within appropriate tolerances and with sufficient conductive material to carry electrical currents without burning up or becoming too hot. The method includes identifying with a controller a bulk metal material to be received and melted by a melter using model data and the user input data received from a user interface, identifying with the controller a substrate onto which at least one ejector ejects melted bulk metal drops, identifying with the controller operational parameters for operating the at least one ejector, the melter, and at least one actuator, which is operatively connected to at least one of a platform and the at least one ejector, the identification of the operational parameters being made using the identified bulk metal material and the identified substrate, and operating with the controller the at least one ejector, the at least one actuator, and the melter using the identified operational parameters to form metal traces on the identified substrate.

A new 3D metal object manufacturing system adjusts operation of the ejector(s) in the printer to form conductive metal traces on substrates with dimensions within appropriate tolerances and with sufficient conductive material to carry electrical currents without burning up or becoming too hot. The system includes a melter configured to receive and melt a bulk metal, at least one ejector operatively connected to the melter to receive melted bulk metal from the melter, a platform configured to support a substrate, the platform being positioned opposite the at least one ejector, at least one actuator operatively connected to at least one of the platform and the at least one ejector, the at least one actuator being configured to move the at least one of the platform and the at least one ejector relative to one another, a user interface configured to receive model data and user input data, and a controller operatively connected to the melter, the at least one ejector, the user interface, and the at least one actuator. The controller is configured to identify a bulk metal material to be received by the melter using the model data and the user input data, identify a substrate onto which the at least one ejector ejects melted bulk metal drops using the model data and the user input data, identify operational parameters for operating the at least one ejector, the at least one actuator, and the melter using the identified bulk metal material and the identified substrate, and operate the at least one ejector, the at least one actuator, and the melter using the identified operational parameters to form metal traces on the identified substrate.

BRIEF DESCRIPTION OF THE DRAWINGS

The foregoing aspects and other features of operating a metal ejecting 3D object printer to adjust operation of the ejector(s) in the printer to form conductive metal traces on substrates with dimensions within appropriate tolerances and with sufficient conductive material to carry electrical currents without burning up or becoming too hot are explained in the following description, taken in connection with the accompanying drawings.

DETAILED DESCRIPTION

Figure 1:
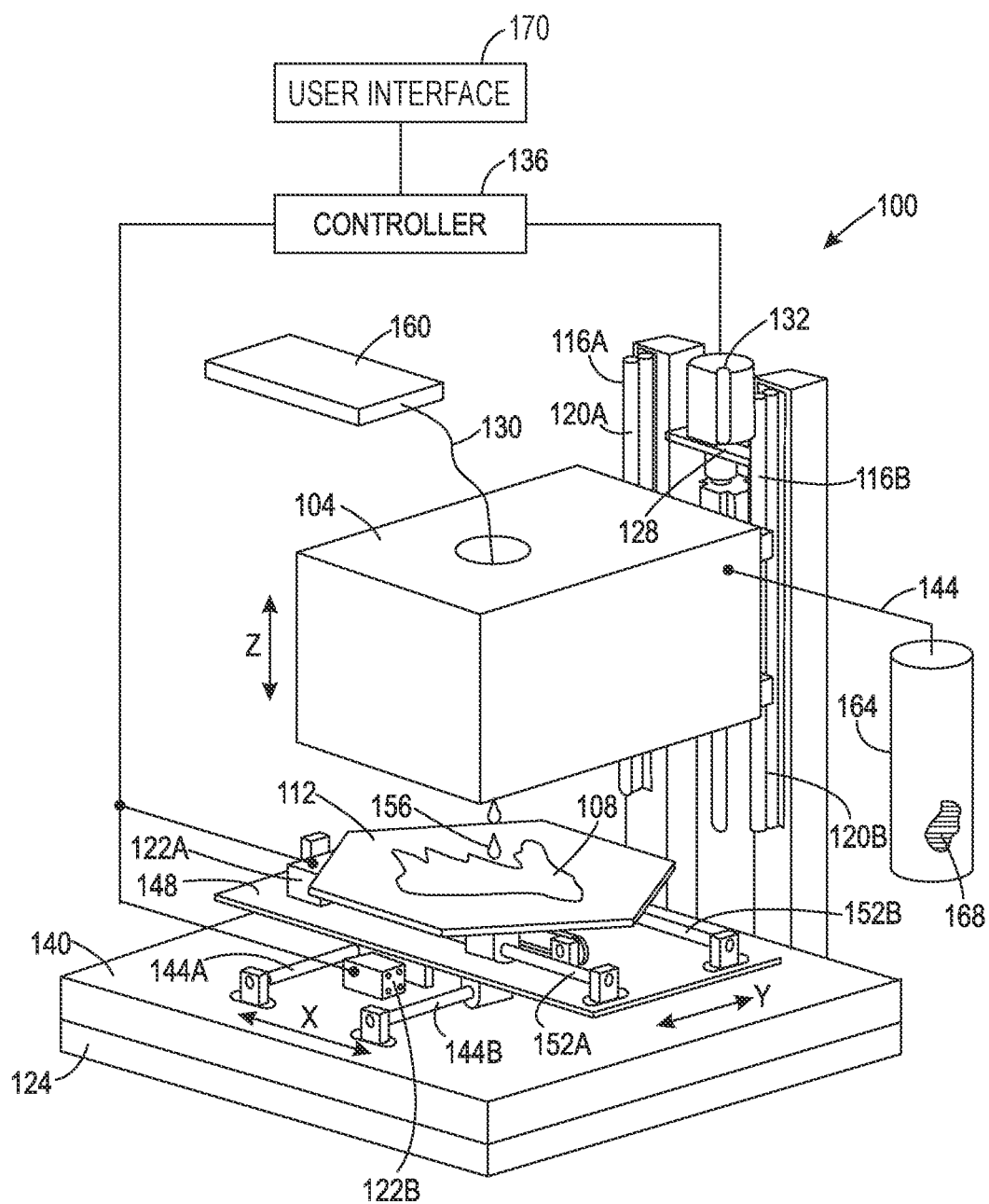
FIG. 1 depicts an additive manufacturing system that operates a liquid metal drop ejector to adjust operation of the ejector(s) in the printer to form conductive metal traces on substrates with dimensions within appropriate tolerances and with sufficient conductive material to carry electrical currents without burning up or becoming too hot.

For a general understanding of the environment for the device and its operation as disclosed herein as well as the details for the device and its operation, reference is made to the drawings. In the drawings, like reference numerals designate like elements.

The ejector head 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the z-axis tracks 116A and 116B. The actuator 132 is operated by a controller 136 to maintain a distance between the multiple nozzles (not shown in FIG. 3) of the ejector head 104 and an uppermost surface of the object 108 on the platform 112.

The printhead 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the printhead 104 to move the printhead along the z-axis tracks 116A and 166B. The actuator 132 is operated by a controller 136 to maintain a predetermined distance between one or more nozzles (not shown in FIG. 1) of the printhead 104 and an uppermost surface of the substrate 108 on the platform 112 and the traces being built on the substrate 108.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the printhead 104. Performing this X-Y planar movement of platform 112 as drops of molten metal 156 are ejected toward the platform 112 forms a line of melted metal drops on the substrate 108. Controller 136 also operates actuator 132 to adjust the vertical distance between the printhead 104 and the most recently formed layer on the substrate to facilitate formation of other structures on the substrate. While the molten metal 3D object printer 100 is depicted in FIG. 1 as being operated in a vertical orientation, other alternative orientations can be employed. Also, while the embodiment shown in FIG. 1 has a platform that moves in an X-Y plane and the printhead moves along the Z axis, other arrangements are possible. For example, the printhead 104 can be configured for movement in the X-Y plane and along the Z axis. Additionally, while the printhead 104 has only one nozzle, it is configured in other embodiments with multiple nozzles and a corresponding array of valves associated with the nozzles in a one-to-one correspondence to provide independent and selective control of the ejections from the nozzles.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During electronic device formation, image data for a structure to be produced are sent to the processor or processors for controller 136 from either a scanning system or an online or work station connection for processing and generation of the printhead control signals output to the printhead 104.

The controller 136 of the melted metal 3D object printer 100 requires data from external sources to control the printer for electronic device manufacture. In general, a three-dimensional model or other digital data model of the device to be formed is stored in a memory operatively connected to the controller 136, the controller can access through a server or the like a remote database in which the digital data model is stored, or a computer-readable medium in which the digital data model is stored can be selectively coupled to the controller 136 for access. In the application being discussed, namely, the formation of electrical circuits on a substrate, the digital map depicts the circuit layout on the substrate and the locations of the leads on the electronic components to which at least some of the electrical traces are connected. This three-dimensional model or other digital data model can be used by the controller to generate machine-ready instructions for execution by the controller 136 in a known manner to operate the components of the printer 100 and form the electrical device corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code for fabrication of the device by the printer. As used in this document, the term "machine-ready instructions" means computer language commands that are executed by a computer, microprocessor, or controller to operate components of a 3D metal object additive manufacturing system to form metal structures on a substrate. The controller 136 executes the machine-ready instructions to control the ejection of the melted metal drops from the printhead 104, the positioning of stage 148 and the platform 112, as well as the distance between the printhead 102 and the uppermost layer of the structures on the substrate 108.

In the scenarios discussed below, the effects of metal trace formation on a substrate are a function of initial drop spacing, drop volume, the number of metal drops, the sequence and placement of drops, and the temperature at which the melted metal drops are ejected. The scenarios, therefore, are exemplary only and other scenarios are possible that are consistent with the principles of drop isolation, height-to-width aspect ratios, and the formation of connecting metal drops noted below.

The behavior of metal drops on substrates can be controlled using a number of parameters that are adjustable in the printing process. These parameters include: drop frequency, spacing, temperature of the drops, and temperature of the substrate. These parameters can be used to control the metal drop freezing process and the formation of traces that are useful for electronic circuits. Various modes of metal trace formation behavior can be seen as these parameters are varied, which makes the process more or less suitable for the formation of circuit elements and conductive traces. Part of the digital model of the device identifies the material of the substrate and the metal being fed to the printhead. Alternatively or additionally, these parameters can be entered by an operator through the user interface 170 of FIG. 1.

In one embodiment of the system 100, the alternating current pulses in the electromagnetic coil surrounding the printhead can be independently varied with respect to pulse length, pulse voltage, and frequency of pulse application to provide control over the dynamics of the melted drop ejection. Drops are typically ejected at a velocity of 1 to 10 meters/second, although other velocities are possible. Additionally, nozzle orifice diameter, the distance between a nozzle orifice and the surface receiving a drop, drop temperature, substrate temperature, and drop spacing can also affect the dynamics of melted drop ejection and interaction between the melted drops, the substrate, and the structures on the substrate. As used in this document, the term "drop spacing" means the distance between the centers of adjacent drops on the substrate. Depending upon the diameter of the ejected drops these adjacent drops can overlap one another by a percentage of 0%, where the drops do not touch one another, to a percentage of 100%, where a drop is ejected directly on top of a previously ejected drop. The overlap percentage can be calculated by the formula: Overlap percentage=(drop diameter−drop spacing)*100/drop spacing, where drop diameter is the diameter of an isolated ejected drop on a particular substrate material.

Figures 2A, 2B, 2C, 2D, 2E, 2F:
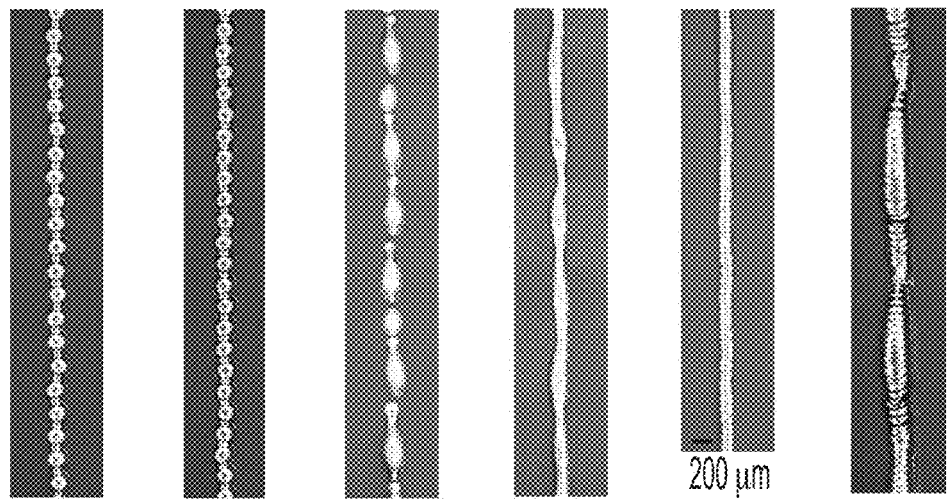
FIG. 2A to FIG. 2F are illustrations of aluminum structures formed on a polyimide substrate formed by the system of FIG. 1 when operated in the frequency and overlap ranges shown in FIG. 3.
Figure 3:
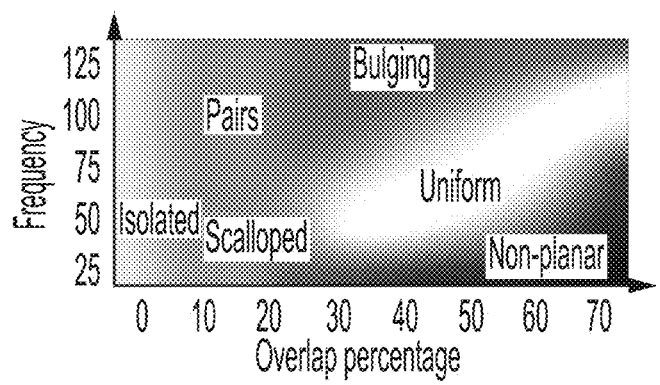
FIG. 3 is a graph of ejection frequency vs. overlap percentage and the resulting structures produced in FIG. 2A to FIG. 2F.

An empirical study of ejecting melted bulk aluminum drops through an orifice of 250 μm onto a 125 μm thick polyimide substrate heated by the platform to maintain a temperature of about 200° C. was conducted. By varying the ejection frequency from 25 Hz to 125 Hz and the overlap percentage from 0% to 70%, different structures were formed on the substrate. The various structures are shown in FIG. 2A through FIG. 2F and a graph of the overlap percentages and ejection frequencies that produced these structures is shown in FIG. 3. As shown in FIG. 2A, an overlap percentage of 0% enables a sequence of isolated metal drops to be formed on the substrate regardless of ejection frequency (FIG. 3). As the overlap percentage is increased up to about 22% and the ejection frequency is kept in the 0 Hz to 50 Hz range, a scalloped line is form (FIG. 2B). At these low frequencies, the individual drop shapes remain relatively unchanged but the increase in overlap percentage results in an increased three-dimensional buildup of the line. As the ejection frequency is increased with the overlap percentage remaining in the 10% to about 22% range, the drops tend to form oblong pairs that are isolated from one another (FIG. 2C). A solid metal line having bulges (FIG. 2D) is formed with overlap percentages in the 23% to 70% range while ejecting the drops with a frequency in the range of about 75 Hz to about 125 Hz. A uniform solid metal line of about 200 µm in width is formed using ejection frequencies in the range of about 50 Hz to about 110 Hz with the overlap percentage being in the about 30% to about 70% range (FIG. 3). Finally, non-planar structures are formed (FIG. 2F) when the ejection frequency is kept relative low (about 25 Hz to about 80 Hz). At the intermediate and higher frequencies, a most recently landed metal drop is still in liquid phase when the next drop that impinges on it lands so some merger occurs. At the lower frequencies, the most recently landed metal drop is at least partially and perhaps completely solidified when the next drop lands. Thus, by controlling ejection frequency and overlap percentage for the metal drops, one can control the type of structure being formed by the melted metal drops.

The electrical conductivity of these various structures vary for the following reasons. When the melted aluminum drops are ejected with a drop spacing that is approximately the same or greater than the diameter of the drops, all of the drops are isolated so they do not form a conductive trace. For drop spacings smaller than the drop diameter causes the drops to overlap and form a scalloped line. Typically, a 5%-25% overlap of the ejected drops occurs when the frequency is below 50 Hz. Under these conditions, a drop partially solidifies before the next drop lands so a conductive trace is formed but the conductivity of the trace is reduced by the scalloped shape of the trace. At higher frequencies, the previously ejected metal drop is still molten enough that the additional heat of the next ejected metal drop is enough to coalesce the drops and form a break in the trace. At these higher frequencies, the overlap is decreased further, typically in the range of 25% and below, so the trace becomes continuous, but the coalescence effects are still evident in the varying thickness of the trace. The conductivity of the trace is limited by the smallest cross-section of the trace. For similar overlaps at very low frequencies, such as 25 Hz or less, the overlap in drops in the trace can cause metal in the trace to lift from the surface. At frequencies between 25 Hz and 50 Hz, a regime of uniformly dimensioned traces with excellent conductive properties are produced. Although not shown in FIG. 2A to FIG. 2F or in the graph of FIG. 3, when the overlap is 100% of a drop's diameter, pillars can be formed, however; the frequency of ejecting the metal drops has a large effect on the height and width of the pillars. At low frequencies, the ejected drops almost solidify before the next drop lands so tall narrow pillars are formed, while at higher frequencies, the heat of the ejected metal drops delay solidification and shorter, wider pillars are formed.

Figures 4A, 4B:
FIG. 4A and FIG. 4B are cross-sectional views of uniform structures of FIG. 2E at different overlap percentages.

FIG. 4A shows a uniform structure of metal drops resembling a semicylindrical wire on the substrate when an overlap percentage of 30% is used, while FIG. 4B shows a uniform structure also resembling a semicylindrical wire on the substrate when an overlap percentage of 60% is used. As can be observed from the figures, the cross-sectional area of the uniform structure increases as the overlap percentage increases. This increase in cross-sectional area occurs because the increase in overlap percentage produces a higher amount of material deposited per unit area. Thus, the cross-sectional area of a uniform line on a substrate can be identified as $A_t = V_{drop}/DS$, where At is the cross-sectional area of the uniform structure, $V_{drop}$ is the volume of each deposited drop, and DS is the drop spacing for the ejected drops. Since cross-sectional area corresponds to wire gauges, the electrical traces on a substrate can be formed with a gauge size that accommodates the current to be passed by the structure. Drop volume can be determined empirically by ejecting metal drops at different frequencies and measuring the height h and radius r with an optical microscope. With these measurements, drop volume $V_{drop}$ is identified by the formula $\frac{1}{3}\pi h(3r-h)$. Additionally, the electrical resistivity of the uniform structures were measured and found to be in a range of about 0.9 to about 1.6 times the electrical resistance of the bulk wire fed to the printhead for melting. Electrical resistance in this range is substantially less than the electrical resistances achieved with conductive solvent inks having nanoparticles of metal.

Figure 5A:
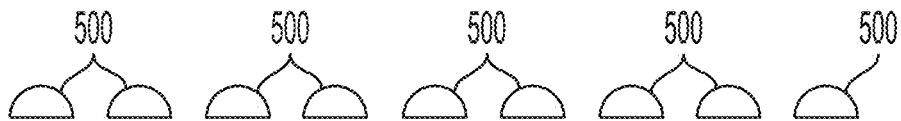
FIG. 5A to FIG. 5C depict different ejection patterns for forming aluminum metal traces on semiconductor wafers.
Figure 5B:
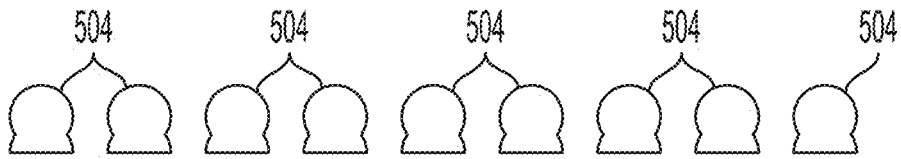
Figure 5C:
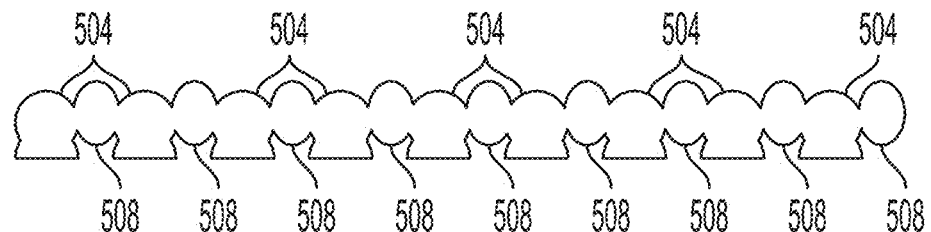

While the metal drop ejecting printer shown in FIG. 1 can be used to make conductive traces on a polyimide substrate, its use to form continuous traces on a silicon wafer or oxide layer on a silicon layer can produce adverse effects. Some of these adverse effects are thought to occur because as the trace cools, the metal trace naturally contracts more than the underlying silicon wafer. The resulting tensile strain can cause traces to delaminate from the surface or even warp thin silicon wafers. A method that avoids thermal warping of the silicon wafer initially ejects the isolated metal drops similar to FIG. 2A along the intended path of the metal trace and then the gaps between the isolated drops are filled during a subsequent pass to form the continuous trace. As used in this document, the term "isolated metal drop" means a metal drop that does not touch another metal drop in either direction along a path of a conductive trace from one end of the trace to the other end. In one embodiment, every other drop of the metal trace is ejected and allowed to cool for initial formation of an interrupted trace. This staggered formation of the metal trace helps reduce the thermal load on the silicon wafer to reduce substrate warping. To eject melted aluminum drops for formation of a metal trace, the aluminum is heated to a higher drop temperature than is typical for 3D metal object formation to help the melted metal drops adhere to the semiconductor wafer. In one embodiment, the aluminum is heated to 900° C. rather than a more typical range of about 700° C. to about 750° C. for this purpose. In most cases, the ejected drop temperature is determined empirically since the appropriate temperature range depends upon the surface properties of the substrate. The silicon wafer may also be heated to encourage adhesion of the melted aluminum drops to the silicon wafer. The printer of FIG. 1 is also operated to build isolated pillars of the melted metal drops. That is, one or more additional drops are ejected onto the isolated drops initially ejected along the metal trace path to increase the aspect ratio of the height of the trace to its width. These pillars help provide sufficient metal for handling the electrical currents through the trace without subjecting the silicon wafer to a damaging thermal load. These pillars are permitted to cool before additional melted metal drops are ejected that connect the pillars to one another and complete the metal trace. The cooled pillars also act as thermal sinks for the more recently ejected drops and so significantly reduce the temperature during completion of the connected trace. The reduced temperature reduces the intensity of the aluminum contraction and the stress load on the silicon or other semiconductor wafer. Thus, an adequate conductivity is achieved and the stresses arising from the ejected metal drops are relieved so the silicon substrate does not warp. The increased height-to-width aspect of the pillars in the metal trace shown in FIG. 5A to FIG. 5C provide more surface area for dissipation of heat that is generated when large currents are passed through the trace. Multiple passes of the metal drop ejector can occur to form, in effect, aluminum walls having a height of metal drops equal to the number of passes and a width of only one metal drop.

This type of metal drop ejecting printer operation is now discussed with reference to FIG. 5A, FIG. 5B, and FIG. 5C. As shown in FIG. 5A, the drops 500 are ejected along the path of the metal trace at a frequency and 0% overlap percentage so the drops are isolated from each other. These drops can be sequentially printed in a single pass using a drop spacing that is large enough to provide an equidistant space between the drops. The thermal stress from cooling each drop is now localized and does not extend along the length of the metal trace. In some embodiments, additional melted metal drops can be printed on top of the solidified or nearly solidified isolated drops to produce pillars 504 of metal drops that are isolated from each other as shown in FIG. 5B. These pillars 504 provide two advantages. For one, they increase the cross-sectional area of the metal trace when it is finished to improve the electrical conductivity of the metal trace and, for another, they provide heat sinks for the ejected melted metal drops that connect the pillars to reduce the stress placed on the semiconductor substrate by the different amounts of contraction experienced by the substrate and the metal drops. These pillars 504 are then connected to one another by the metal drops 508 as shown in FIG. 5C. The connecting metal drops 508 are ejected so they contact the pillars on each side of the metal drop and can freeze to both pillars before they reach the substrate. Depending upon the size of the ejected drops, the size of the pillars, and the distance between pillars, these connecting drops may or may not touch the substrate. Consequently, the temperature of the trace and the space between the pillars is reduced as isolated drops are connected to provide reduced stress between the trace and the substrate.

In circuits not requiring the electrical conductivity provided by the pillars, the isolated metal drops initially ejected onto the substrate as shown in FIG. 5A can be connected by the subsequently ejected drops so the trace is formed with a single line of metal drops. This two-pass technique still attenuates the thermal stress on the substrate so the substrate is subjected to little or no shrinkage during the trace formation process.

Figure 6A:
FIG. 6A to FIG. 6D depict different ejection patterns for forming aluminum metal traces on semiconductor wafers.
Figure 6B:
Figure 6C:
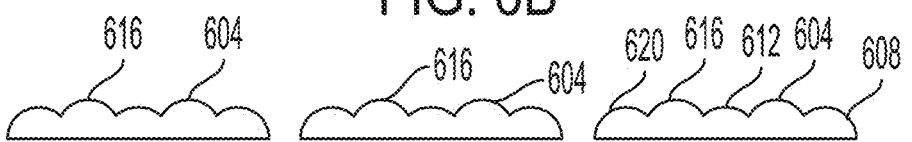
Figure 6D:

Another way of producing a metal trace is shown in FIG. 6A to FIG. 6D. In FIG. 6A, every other metal drop is ejected onto the silicon substrate as discussed above with reference to FIG. 5A. On the next pass, every fourth connecting metal drop 604 is ejected after the first connecting metal drop is ejected into the gap between the first metal drop 608 and the second metal drop 612 as shown in FIG. 6B. On the next pass, every fourth connecting metal drop 616 is ejected after the first connecting metal drop is ejected into the gap between the second metal drop 612 and the third metal drop 620 as shown in FIG. 6C. On the final pass in this scenario, every fourth connecting metal drop 624 is ejected after the first connecting metal drop is ejected into the gap between the third metal drop 620 and the fourth metal drop 628 as shown in FIG. 6D. This method of printer operation forms a metal trace with a line of single metal drops without subjecting the underlying substrate with a stress that leads to the substrate warping.

Some substrates are sufficiently robust that they can withstand the thermal stresses arising from the melted metal drops without requiring multiple passes of the ejector to form a single trace. For these substrates, multiple passes of the ejector(s) along the same trace path are used to increase the height of the trace more quickly. The taller trace has more conductive metal in it so it can handle a higher current. Additionally, by ejected metal drops at the same drop spacing on multiple passes, the ejector(s) form each layer of the trace with a uniform cross-section.

Figure 7A:
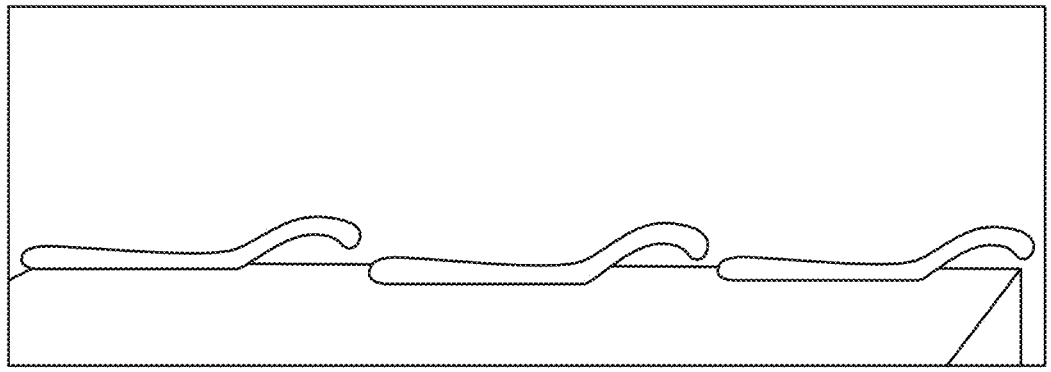
FIG. 7A is an illustration of an elevated portion of a metal trace formed for connection to a lead on an electronic component on a substrate.
Figure 7B:
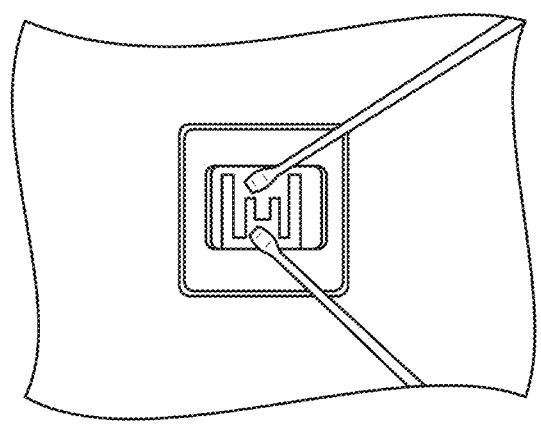
FIG. 7B depicts lifted traces, such as those shown in FIG. 7A, being connected to an integrated circuit component.

Using molten metal droplet jetting techniques similar to those used to fabricate engineered lattice structures, electronic traces can be formed that lift up and off of the substrate. These techniques can also be used to produce traces that lift off of the surface around another trace so the traces can cross without electrical connection to one another. For example, successive metal drops can be ejected slightly off center from a previously ejected metal drop in a common direction with an overlap percentage of at least 70% overlap to build the height of the trace above the surface of the substrate and extend the trace in the common direction. That is, the previously ejected drops form a rising pillar that leans in the common direction so the trace is elevated above the lead of an electronic component and then subsequently ejected metal drops can connect the lead of the electronic component to the elevated metal trace. An example of an elevated trace is shown in FIG. 7A. These lifted traces can then be connected to circuit leads for integrated circuit components, passive components, and the like as shown in FIG. 7B.

Figure 8:
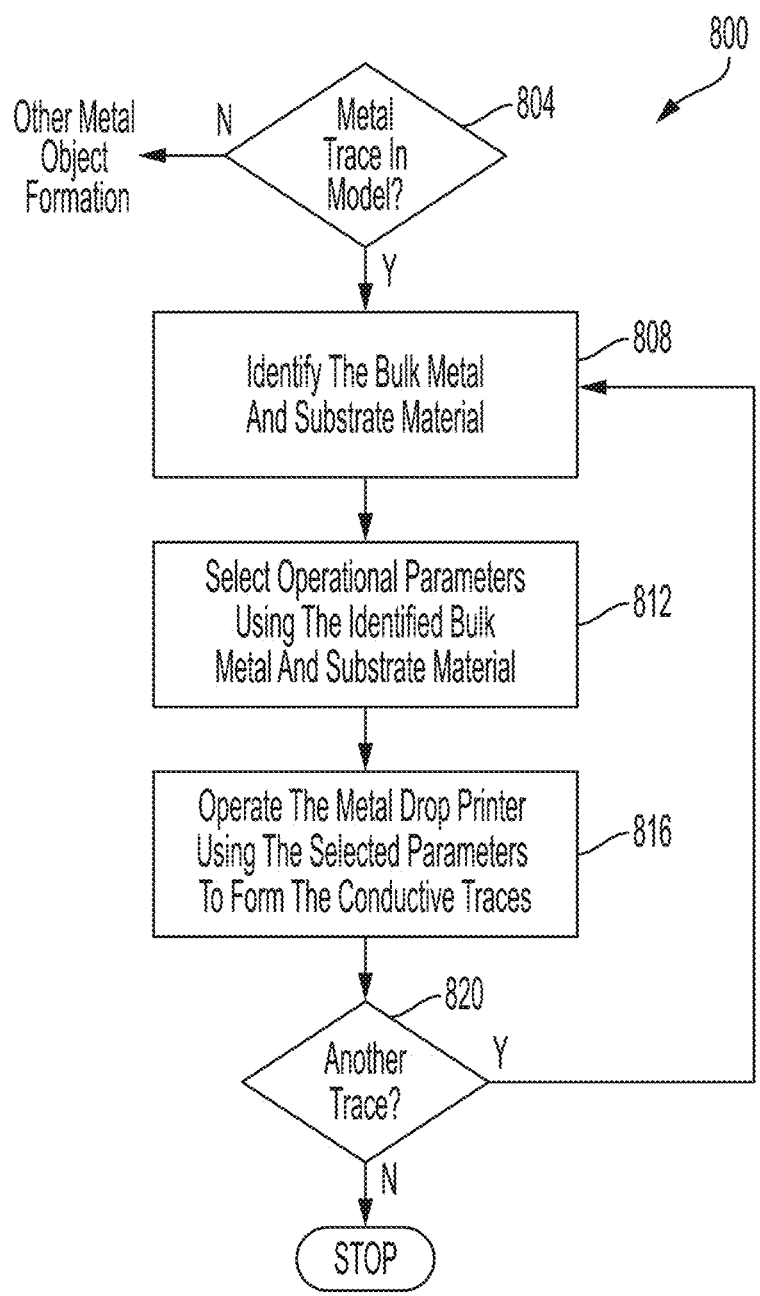
FIG. 8 is a flow diagram for a process for operating the system of FIG. 1 to form metal traces on different types of material substrates.

A process for operating the printer shown in FIG. 1 is shown in FIG. 8. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 8 is a flow diagram of a process 800 that operates the printing system 10 to adjust operation of the ejector(s) in the printer to form an electronic device having conductive metal traces on substrates with dimensions within appropriate tolerances and with sufficient conductive material to carry electrical currents without burning up or becoming too hot. The process 800 begins with detection of a metal trace within a three-dimensional digital model of an electrical circuit (block 804). The process then identifies the bulk metal being melted and the material of the substrate onto which the melted bulk metal is ejected (block 808). This identification can occur from data in the digital model of the electronic device being formed or from the user interface. The process then selects operational parameters for forming the metal trace (block 812). These operational parameters include an ejection frequency, an overlap percentage, a melting temperature for the bulk metal, one or more patterns for the trace formation, a height-to-width aspect ratio, and the like. These operational parameters are then used to operate the system to form the metal trace on the substrate including connecting the trace to electronic component leads, if necessary (block 816). This process continues (block 820) until the electronic device has been formed.

It will be appreciated that variants of the above-disclosed and other features and functions, or alternatives thereof, may be desirably combined into many other different systems, applications or methods. For example, the melted ejected drops discussed above are melted aluminum drops but melted drops of other conductive metals are intended as well. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
a melter configured to receive and melt a bulk metal;
at least one ejector operatively connected to the melter to receive melted bulk metal from the melter;
a platform configured to support a substrate, the platform being positioned opposite the at least one ejector;
at least one actuator operatively connected to at least one of the platform and the at least one ejector, the at least one actuator being configured to move the at least one of the platform and the at least one ejector relative to one another;
a user interface configured to receive model data and user input data; and
a controller operatively connected to the melter, the at least one ejector, the user interface, and the at least one actuator, the controller being configured to:
identify a bulk metal material to be received by the melter using the model data and the user input data;
identify a substrate onto which the at least one ejector ejects melted bulk metal drops using the model data and the user input data;
identify operational parameters for operating the at least one ejector, the at least one actuator, and the melter using the identified bulk metal material and the identified substrate; and
operate the melter at a predetermined temperature corresponding to the identified bulk metal and the identified substrate;
operate the at least one ejector at a predetermined ejection frequency and a predetermined overlap percentage corresponding to the identified substrate and the identified bulk metal;
operate the at least one actuator to move the platform and the at least one ejector relative to one another to provide one of a plurality of predetermined drop spacings for melted metal drops ejected from the at least one ejector onto the identified substrate, the provided predetermined drop spacing corresponding to the identified bulk metal and the identified substrate, the predetermined drop spacing corresponds to a 0% percentage of overlap, and a separation between adjacent ejected melted metal drops is equal to or greater than one diameter of an ejected melted metal drop when the identified bulk metal is aluminum and the identified substrate is a semiconductor wafer or an oxide layer on a semiconductor wafer; and
operate the at least one ejector to eject at least one melted metal drop on each of the previously ejected separated metal drops with an overlap percentage of 100% before operating the at least one ejector to eject melted metal drops that freeze to at least one of the separated metal drops after the ejected melted metal drops reach the substrate to connect the separated metal drops to form metal traces on the identified substrate.

2. The apparatus of claim 1 wherein the predetermined ejection frequency is within a range of 50 Hz to 110 Hz and the predetermined overlap percentage is within a range of 30% overlap to 70% overlap to produce a uniform solid metal line when the identified bulk metal is aluminum and the identified substrate is polyimide.

3. The apparatus of claim 1 wherein the predetermined temperature is at least 900° C. when the identified bulk metal is aluminum and the identified substrate is a semiconductor wafer or an oxide layer on a semiconductor wafer.

4. The apparatus of claim 1 wherein the operation of the at least one ejector to eject melted metal drops that connect the separated metal drops produces ejected melted metal drops that freeze to at least one of the separated metal drops before the ejected metal drops reach the substrate.

5. The apparatus of claim 1, the controller being further configured to:
operate the at least one ejector to eject successive melted metal drops with an overlap percentage of at least 70% overlap to raise a portion of one of the metal traces above the identified substrate and extend the portion of the one metal trace in a predetermined direction.

6. The apparatus of claim 5 where the raised portion of the one metal trace avoids another one of the metal traces on the substrate.

7. The apparatus of claim 5, the controller being further configured to:
operate the at least one ejector to eject melted drops to connect raised portions of at least two separate metal traces to form a portion of one of the metal traces that is above a surface of the substrate.

8. The apparatus of claim 5, the controller being further configured to:
operate the at least one ejector to eject melted drops to connect the raised portion of the one metal trace to an electronic component lead on the substrate.

9. The apparatus of claim 1, the controller being further configured to:
operate the at least one ejector to eject melted drops to form a first layer for a single trace in a single pass; and
operate the at least one ejector to eject melted drops to form a second layer of the single trace to produce a trace that is taller than the first layer or the second layer separately.

10. The apparatus of claim 9, the controller being further configured to:
operate the at least one ejector to eject melted drops at a same spacing to form the first layer and the second layer of the taller trace with a uniform cross-section.

* * * * *